UNITED STATES PATENT OFFICE.

FRITZ HOFMANN, OF ELBERFELD, GERMANY.

ETHYL ETHER OF SALICYLO-CARBONIC ACID.

SPECIFICATION forming part of Letters Patent No. 639,174, dated December 12, 1899.

Application filed October 31, 1899. Serial No. 735,394. (Specimens.)

*To all whom it may concern:*

Be it known that I, FRITZ HOFMANN, doctor of philosophy, chemist, residing at Elberfeld, Germany, (assignor to the FARBENFABRIKEN OF ELBERFELD COMPANY, of New York,) have invented a new and useful Improvement in the Manufacture or Production of a New Pharmaceutical Compound; and I hereby declare the following to be a clear and exact description of my invention.

My invention relates to the production of the hitherto-unknown ethylic ether of salicylo-carbonic acid having most probably the formula

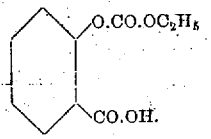

According to my researches this new compound can be easily obtained by the action of the ethylic ether of chloro-carbonic acid having the formula $C_2H_5O.CO.Cl$ on salicylic acid in the presence of a suitable basic compound, such as dimethylanilin or the like. The ether so obtained possesses a great therapeutic value. It is capable of forming stable alkaline salts, which are readily soluble in water, and it can be employed in the shape of one of these salts as a valuable remedy against rheumatic fever. The doses employed for this purpose are from one-half to one gram.

In carrying out my new process practically I can proceed as follows, the parts being by weight: A mixture of one hundred and thirty-eight parts of pure salicylic acid and of two hundred and forty-two parts of dimethylanilin is dissolved in benzene. To the solution thus obtained 108.5 parts of the ethylic ether of chloro-carbonic acid, which is likewise dissolved in benzene, are added under cooling and energetically stirring. Stirring is continued until the pungent smell of the chloro-carbonic ether has disappeared. Subsequently the reaction-mass is acidulated by means of diluted hydrochloric acid while continuously stirring. The watery solution thus produced, which contains the dimethylanilin hydrochlorate, is separated from the benzene solution which contains the new ether. On evaporating the latter solution the ethylic ether of salicylo-carbonic acid is obtained in the shape of a crystalline mass, which is purified by crystallization from a mixture of ether and ligroin. It is thus obtained in the shape of a white crystalline powder, melting at 95° centigrade, and which is readily soluble in alcohol, ether, chloroform, and in benzene, and is also soluble in water. The alcoholic solution of the ethylic ether of salicylo-carbonic acid is not colored violet by a ferric chlorid solution, as is the case when using ferric chlorid and an alcoholic solution of salicylic acid. The new compound yields in the known manner alkaline salts of the general formula:

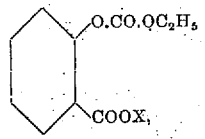

(X meaning an atom of a monovalent alkali, such as sodium, potassium, or the like,) which when dry and pulverized are white powders easily soluble in water.

Having now described my invention and in what manner the same is to be performed, what I claim as new, and desire to secure by Letters Patent, is—

As a new article of manufacture the ethylic ether of salicylo-carbonic acid, having most probably the formula:

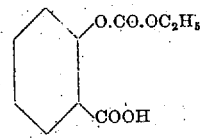

being a white crystalline powder melting at 95° centigrade, which is readily soluble in alcohol, ether, chloroform, and benzene, also soluble in water, the alcoholic solution being not colored violet by a ferric chlorid solution as is the case when using ferric chlorid and an alcoholic solution of salicylic acid, and which is capable of forming stable alkaline salts, of the general formula:

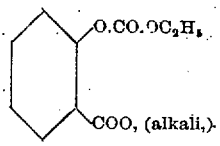

these salts being when dry and pulverized white powders easily soluble in water and exhibiting valuable therapeutic properties, substantially as hereinbefore described.

In testimony whereof I have subscribed my name in the presence of two subscribing witnesses.

FRITZ HOFMANN.

Witnesses:
R. E. JAHN,
OTTO KÖNIG.